United States Patent [19]

Inazawa et al.

[11] Patent Number: 5,144,501
[45] Date of Patent: Sep. 1, 1992

[54] DATA RECORDER AND METHOD OF OPERATION

[75] Inventors: Yoshizumi Inazawa; Shinya Ozaki, both of Kanagawa, Japan; Brian Milthorp; Bruce Thompson, both of Wokingham, England

[73] Assignees: Sony Corporation, Tokyo, Japan; Hewlett-Packard Limited, Berkshire, England

[21] Appl. No.: 745,991

[22] Filed: Aug. 8, 1991

Related U.S. Application Data

[63] Continuation of Ser. No. 293,695, Jan. 5, 1989, abandoned.

[30] Foreign Application Priority Data

Jan. 8, 1988 [GB] United Kingdom ............... 8800351

[51] Int. Cl.$^5$ .............................................. G11B 5/09
[52] U.S. Cl. ......................................... 360/48; 360/32
[58] Field of Search ................ 360/32, 48, 9.1, 27, 360/49, 53; 358/341, 343

[56] References Cited

U.S. PATENT DOCUMENTS

| | | | |
|---|---|---|---|
| 4,541,019 | 9/1985 | Precourt | 360/48 |
| 4,821,128 | 4/1989 | Inazawa et al. | 360/72.2 |
| 4,873,589 | 10/1989 | Inazawa et al. | 360/53 |
| 4,893,199 | 1/1990 | Okada | 360/48 |
| 4,899,232 | 2/1990 | Odaka et al. | 360/48 |
| 5,012,459 | 4/1990 | Odaka et al. | 360/32 |

FOREIGN PATENT DOCUMENTS

0140696 A3  5/1985  European Pat. Off. .

OTHER PUBLICATIONS

Computer Technology Review, vol. 5, n. 4, 1985, Los Angeles US, pp.107-114; S. Henry and M. Niquette; "The PC/T Tape Format Makes Data Backup Easier, More Reliable".
IEEE Transactions on Consumer Electronics, vol. CE-33, No. 3, Aug. 1987, New York US, pp.275-284; T. Adachi et al.; "A Fast Random Accessing Scheme for R-DAT".
IEEE Transactions on Consumer Electronics, vol. CE-32, No. 3, Aug. 1986, New York US, pp.433-440; K. Odaka et al.; "Format of Pre-recorded R-DAT Tape and Results of High Speed Duplication".
Proceedings of the International Congress on Transportation Electronics, vol. P-183, Oct. 1986, Warrendale, PA, USA, pp. 321-331; M. Finer; "Sony Digital Audio Tape (DAT)".

*Primary Examiner*—Aristotelis Psitos
*Assistant Examiner*—Varsha V. Sheladia
*Attorney, Agent, or Firm*—Philip M. Shaw, Jr.

[57] ABSTRACT

In this invention, a predetermined amount of data is given as one frame, and data having a predetermined format is recorded for each frame. A first area recording main data and a second area recording sub data are formed in each frame. Plural types of units each consisting of a plurality of frames are set, and a number of first units from a leading end of a recording medium and the numbers of other units from the leading end of the recording medium to a trailing end of the first units are recorded in the second area of a frame constituting the unit including the trailing end, thus facilitating a high-speed search operation.

10 Claims, 6 Drawing Sheets

| | MSB | | | | | LSB |
|---|---|---|---|---|---|---|
| PC 1 | 0 | 0 | 1 | 0 | T. B. O. | |
| PC 2 | SSMC (SAVE SET MARK COUNT)(MSB) | | | | | |
| PC 3 | SSMC (SAVE SET MARK COUNT)(LSB) | | | | | |
| PC 4 | RMC (RECORD MARK COUNT)(MSB) | | | | | |
| PC 5 | RMC (RECORD MARK COUNT) | | | | | |
| PC 6 | RMC (RECORD MARK COUNT) | | | | | |
| PC 7 | RMC (RECORD MARK COUNT)(LSB) | | | | | |
| PC 8 | PARITY | | | | | |

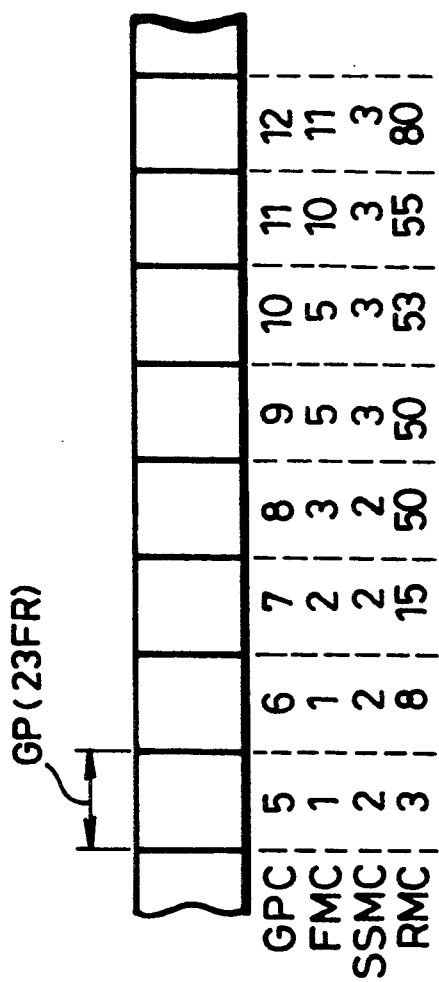

DATA RECORDER AND METHOD OF OPERATION

This is a continuation of co-pending application Ser. No. 07/293,695 filed on Jan. 5, 1989, now abandoned.

BACKGROUND OF THE INVENTION

1. Field of the Invention

The present invention relates to an apparatus and method for recording and/or reproducing a digital signal, and more particularly to such an apparatus and method suitable for use in recording and/or reproducing a digital signal transferred from a computer or the like.

2. Description of the Prior Art

In practice, data stored in a hard disk or the like of a computer can be transferred to and recorded by a data streamer (data-recorder) once a day so as to protect the data or back up the same.

For this operation, or as a data recorder, analog audio tape recorders have been conventionally used in many cases. However, analog tape recorders have disadvantages in that they need an excessive amount of a recording medium or magnetic tape for recording and operate at a quite low data transferring rate upon recording, so that it takes too much time to transfer and record such data information. Moreover, analog tape recorders have problems, e.g. the starting point of a desired portion of the recorded data information cannot be rapidly searched for, and so on.

Thus, to overcome the above-mentioned problems, it is thought to utilize a helical-scan type DAT (digital audio tape recorder) using a rotary head, that is, a so-called recently commercialized DAT as a data recorder. Such data recorders utilizing a DAT are described in U.S. Pat. Nos. 4,873,589, 4,899,232, 4,876,616, and 5,012,459 by one of the assignees of the present application.

To utilize the DAT as a data recorder, data transferred from a host computer is transformed in accordance with a DAT format before recording. In the DAT format, one frame is made up of two oblique tracks formed by one rotation of two heads respectively having a different azimuth angle with each other. 16-bit PCM audio data, which has been interleaved, and auxiliary sub-data are recorded in this one frame area as a unit. During recording, there are formed in each track a main area for recording the PCM data and a sub-area for recording the sub-data.

The DAT has a high-speed search function, enabling the data to be easily searched.

SUMMARY OF THE INVENTION

It is a first object of the present invention to provide a data recorder which can accept a plurality of types of data units each consisting of an independent amount of data.

It is a second object of the present invention to easily perform a high-speed search operation using a digital data recorder by selectively detecting the plurality of types of units in the data search mode.

The above and other objects are achieved by the apparatus and method of the present invention for recording digital data on a recording medium wherein predetermined amounts of the data are treated as separate frames and data having a predetermined format is recorded on the recording medium for each frame, the data format being such that the data is organized into main data and sub data for each frame, and wherein a first area for recording main data and a second area for recording sub data are formed in each frame.

According to the method and apparatus of the present invention, recorded on the medium are a plurality of types of data segmentation units each consisting of a plurality of frames and a first count signal indicating the number of a first type of such data segmentation units from a leading end of the recording medium and a second count signal indicating the number of another type of such data segmentation units from the leading end of the recording medium to a trailing end of the first units. Further recorded on the medium are the first and second count values in the second area of each frame forming part of the first unit including the trailing end.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 9 is a view showing a relationship between groups and other units.

DETAILED DESCRIPTION OF THE PREFERRED EMBODIMENT

Figure 1:
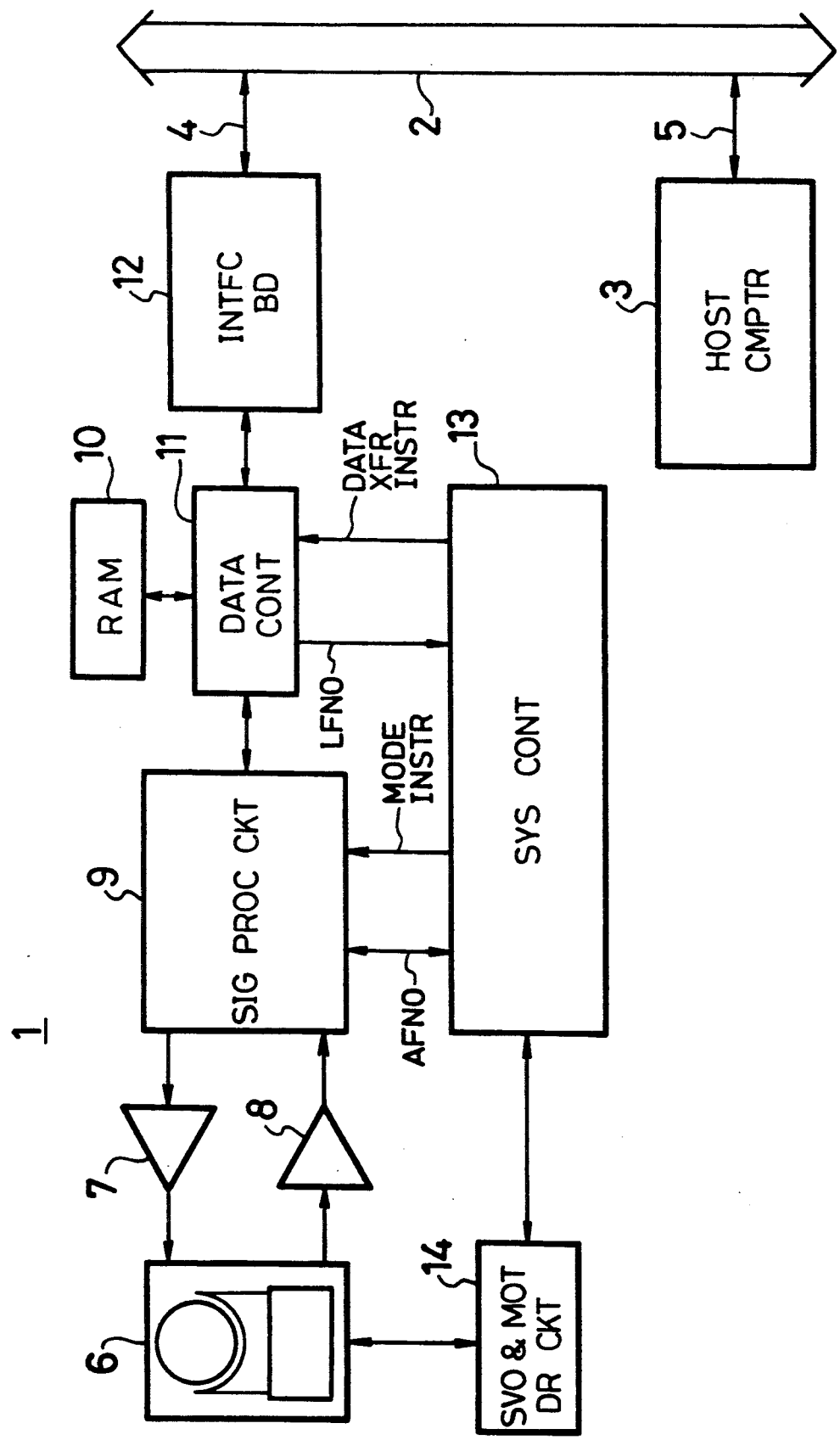
FIG. 1 is a block diagram showing an embodiment of the present invention.

FIG. 1 shows an arrangement when a DAT is used as a data recorder. Reference numeral 1 denotes a DAT; 2, an interface bus; 3, a host computer; and 4 and 5, inner buses. The DAT 1 is mainly constituted by a recording-/reproducing section 6, a recording amplifier 7, a reproducing amplifier 8, a signal processing circuit 9, a RAM 10, a data controller 11, an interface board 12, a system controller 13, a servo and motor drive circuit 14 and the like.

The system controller 13, the signal processing circuit 9 and the data controller 11 are arranged to exchange predetermined signals such as an absolute frame number AFNO, a mode instruction, a logical frame number LFNO, a data transfer instruction and the like.

Although not shown, the recording/reproducing section 6 is provided with a rotary head drum. A magnetic tape is wound around the drum in an angular range of about 90° and is fed by a capstan. The drum has two heads A and B having different azimuth angles. During one revolution of the drum, two oblique tracks are recorded or reproduced on or from the tape.

Digital data supplied from the host computer 3 through the buses 5, 2 and 4 are input to the interface board 12, and are then subjected to predetermined signal processing in the data controller 11, the RAM 10, the signal processing circuit 9 and the like in accordance with instructions from the system controller 13. In this manner, conversion to the DAT format described above is performed. The converted signal is supplied to the recording or reproducing section 6 through the recording amplifier 7, and is recorded on the magnetic tape by the heads A and B.

The signal recorded on the magnetic tape can also be reproduced by the heads A and B. The reproduced signal is supplied to the signal processing circuit 9 through the reproducing amplifier 8. Digital data which is obtained by reconverting the reproduced signal by the signal processing circuit 9 is supplied to the host computer 3 through the data controller 11, the interface board 12 and the buses 4, 2 and 5.

Figure 2:
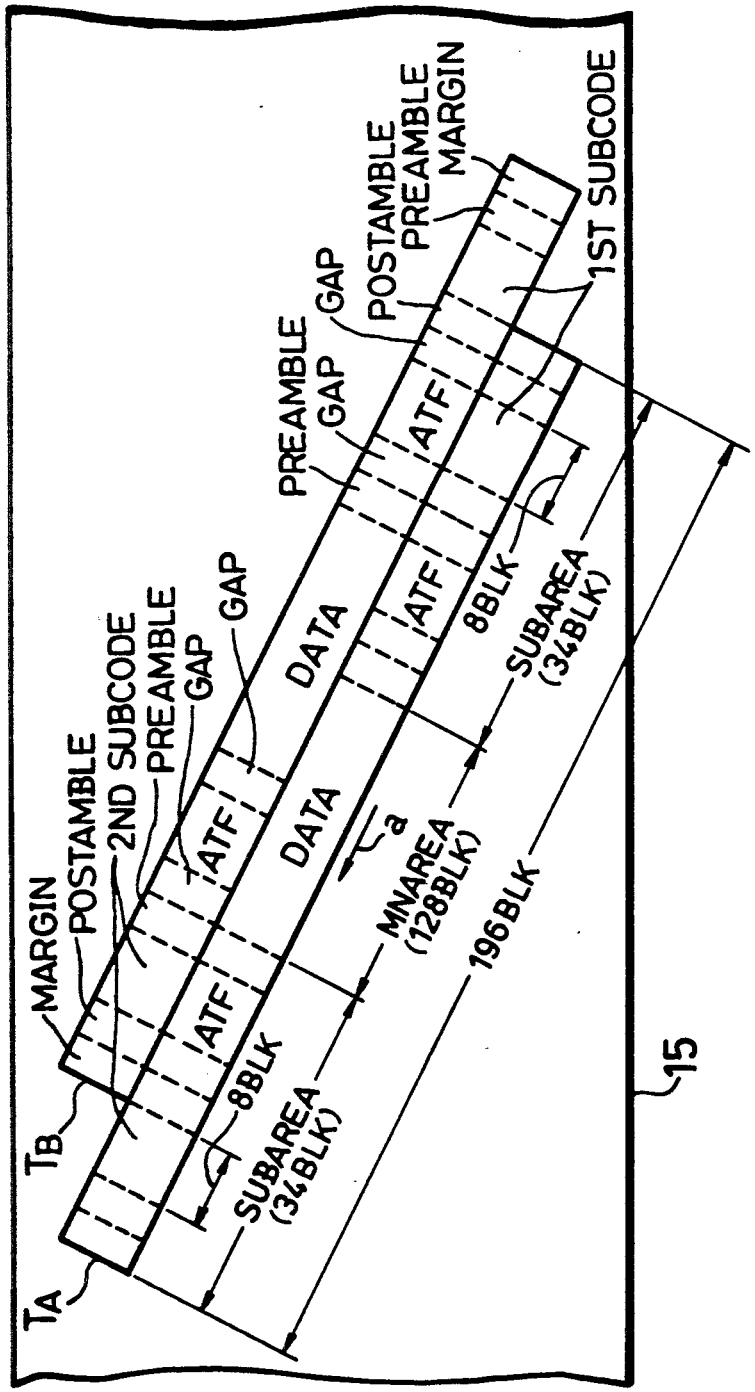
FIG. 2 is a view showing a DAT format.

In the above apparatus, the DAT format on the magnetic tape is as shown in FIG. 2.

In FIG. 2, during one revolution of the heads A and B, two oblique tracks $T_A$ and $T_B$ are formed on a tape 15 from its lower side, as indicated by an arrow a. The two tracks $T_A$ and $T_B$ constitute one frame. The track $T_A$ (or $T_B$) consists of 196 blocks, and one block consists of 288 bits. 34 blocks at each end portion serve as a L- sub area, and 128 central blocks serve as a main area.

Each sub area is further divided into sections. More specifically, there are provided, from the lower end of the track, a margin section, a PLL preamble section of a sub code, a first sub-code section constituted of 8 blocks, a postamble section, a gap section for a block section, a tracking (ATF) signal section, a gap section between adjacent blocks, and a PLL preamble of data. Then, after the main data section there follows a gap section between adjacent blocks, an ATF signal section, a gap section between adjacent blocks, a PLL preamble section of a sub code, a second sub-code section constituted by 8 blocks, a postamble second sub-code section, and a margin section The other blocks are constituted by predetermined numbers of blocks, respectively. Note that in FIG. 2, the measure of lengths of sections is not accurately depicted.

Figure 3:
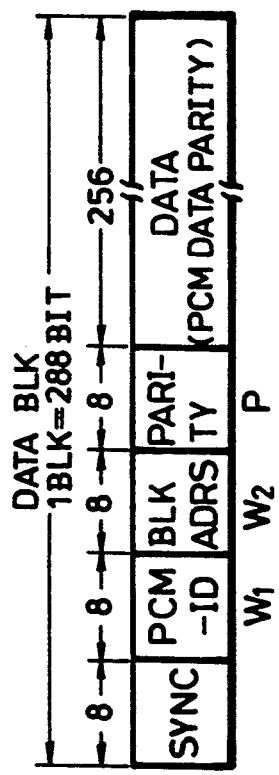
FIG. 3 is a view showing the data format of a main data block.

The main area consists of 128 data blocks. As shown in FIG. 3, each block is constituted by an 8-bit sync signal, an 8-bit PCM-ID ($W_1$), an 8-bit block address ($W_2$) and an 8-bit parity, and main data is stored in the following 256-bit section. The main data is 16-bit PCM data for L and R channels when an audio signal is processed. The 16-bit main data are interleaved in the main areas of the tracks $T_A$ and $T_B$ (one frame) together with the parity. In this case, in the main areas in one frame, about 5760-bytes of data is recorded. When the DAT is used as a data recorder, the data sent from the host computer 3 are converted into 16-bit data and are processed in the same manner as the PCM data. These data are formatted as shown in FIG. 4, and are recorded in the main area of each frame.

Figure 4:
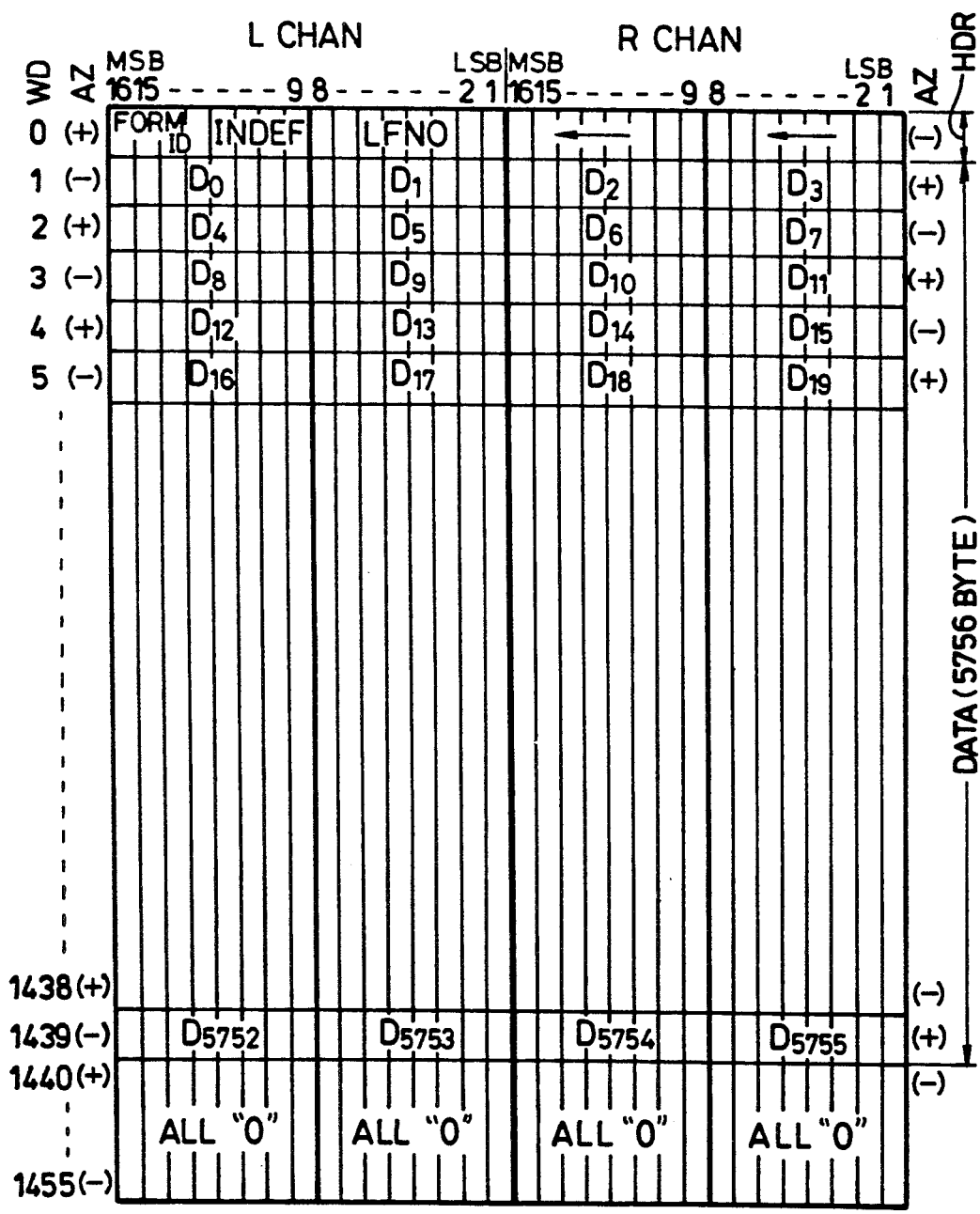
FIG. 4 is a view showing a format of a main area for one frame.

More specifically, in FIG. 4, the above 5760 bytes are divided into words (0 to 1439), each consisting of 4 bytes (32 bits). These words are divided into 16-bit (2-byte) L and R channels to comply with the audio signal format. In this format, a header portion is provided in the first 1 word (4 bytes). 4 bits near the most significant bit (MSB) of the first half byte in the L channel in this header portion serve as a format ID indicating the format of the data recorder, and the remaining 4 bits of this byte are indefinite. The remaining one byte in this L channel are used as logical frame number (LFNO) areas. Each 8-bit area LFNO provides a binary value indicating one of the series of numbers 1 to 23 to designate each frame in units of 23 frames. In the R channel in the header portion, the same data as that in the L channel are provided.

A total of 5756 bytes of a data portion is provided in the following words "1" to "1439", and data signals from the host computer 3 are sequentially stored in respective words in units of 4 bytes.

The logical frame number LFNO will now be described. Each LFNO area indicates one of the serial numbers 1 to 23 of the frames in each unit of 23 frames. That is, the frame numbers 1 to 23 repeatedly appear every group of 23 frames. Since a unit numbered by such LFNOs is used, the division for each predetermined amount of data can be easily detected, and signal processing can be facilitated.

The data formats in the first and second sub-code sections in the sub area will now be described. Each of the first and second sub-code sections consists of 8 sub-code blocks, and can record 2048-bits of data.

Figures 5A, 5B, 6:
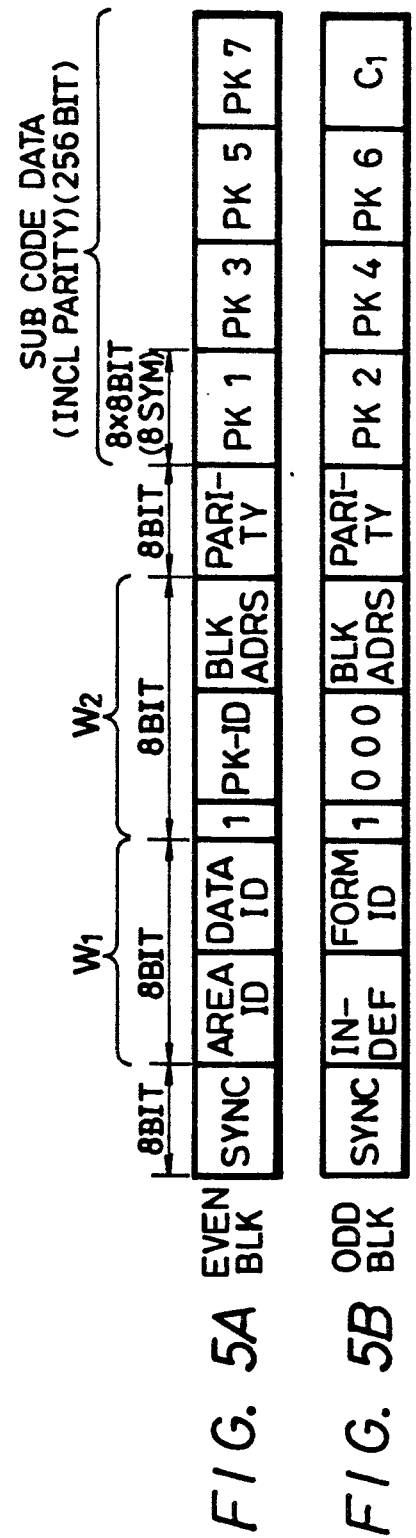
FIGS. 5A and 5B are depictions of the data formats of the EVEN and ODD sub code blocks, respectively.
FIGS. 6 and 7 are views showing data formats of packs in the sub-code block.

FIGS. 5A and 5B show, respectively, the constructions of the even-numbered sub-code block (EVEN block) and the odd-numbered sub-code block (ODD block), in each of which a synchronizing signal, the areas $W_1$ and $W_2$ and a parity, respectively formed of eight bits, and 256 bits of sub-code data including a parity are located in this order. The sub-code data is divided into four packs formed of 64 (8×8) bits (eight symbols), respectively.

As shown in FIGS. 5A and 5B, the contents of $W_1$ and $W_2$ in the EVEN block are different from those in the ODD block, and the packs in the EVEN and ODD blocks are alternately numbered from "1" to "7". The eighth pack is assigned to record an error detecting code $C_1$.

$W_1$ of the EVEN block consists of a 4-bit area ID and a 4-bit data ID, and $W_2$ thereof consists of an upper bit "1", a 3-bit pack ID, and a 4-bit block address. $W_1$ in the ODD block consists of a 4-bit indefinite portion, and a 4-bit format ID, and $W_2$ thereof consists of an upper bit "1", a 3-bit all "0", code, and a 4-bit block address.

Each of the packs "1" to "7" is divided into 8 words in units of 8 bits. Each word includes, together with a parity, various codes such as a code indicating a read-in area of a recording start portion on a tape, a code indicating a read-out area of a recording end portion, a code indicating a recording date, an absolute frame number, a logical frame number and the like.

Figures 7, 8:
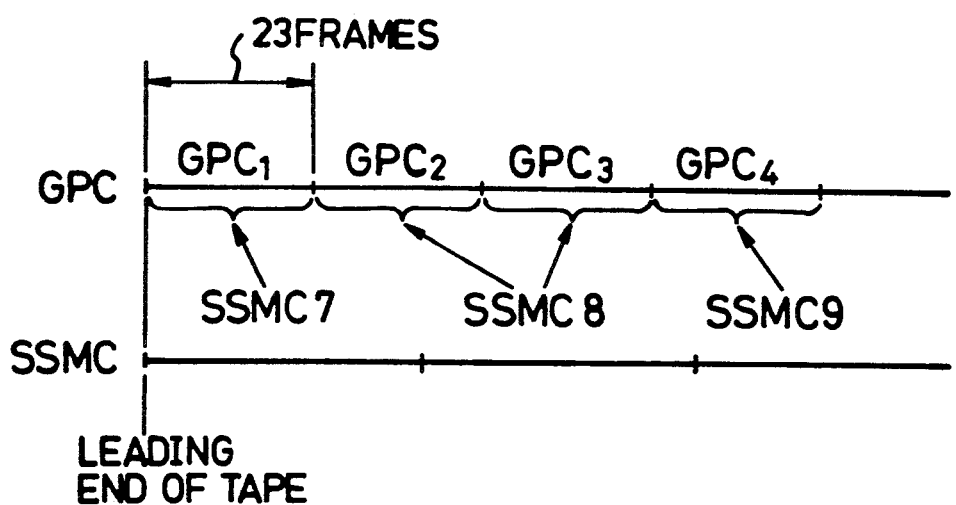
FIG. 8 is a view showing the relationship between groups and save sets.

FIG. 6 shows the format of the pack "1" of the seven packs, and FIG. 7 shows the format of the pack "2".

Referring to FIG. 6, the pack "1" consists of eight 8-bit words, PC1 to PC8. The upper four bits of PC1 are assigned to a pack number (in this case, "0001"indicating pack "1"), and the next 2 bits are indefinite. The following lower two bits (P,M) provide a repeat ID (R-ID) associated with multiple writing according to the present invention. The following PC2 and PC3 (16 bits) are assigned to a group count. The group count is a value obtained by counting the number of groups of frames from the leading end of a tape, including the current group. When data is multiply written, the identical group count value is provided to the multiply written portion.

The following words PC4 to PC7 (32 bits) are assigned to a file mark count FMC. A file mark indicates a division of a predetermined amount of data sent from the host computer. The file mark count FMC is a value obtained by counting the number of file marks from the leading end of the tape to the end of the current group.

The word PC 8 is assigned to a parity for the words PC1 to PC7.

In FIG. 7, the pack "2" consists of 8 words PC1 to PC8. The upper 4 bits of the word PC1 are assigned to a pack number (in this case, "0010" indicating the pack "2"). The words PC2 and PC3 (16 bits) are assigned to a save set mark count SSMC. Data recorded by the data recorder during one back-up operation is called a save set, and a save set mark is sent from the host computer for each save set. The save set mark count SSMC indicates a value obtained by counting the number of save set marks from the leading end of the tape until counting of the count GPC is completed for each group of 23 frames. The following words PC4 to PC7 (32 bits) are assigned to a record mark count RMC. A record mark is a mark sent from the host computer for each division of the predetermined amount of data. The record mark count RMC indicates a value obtained by counting the number of record marks from the leading end of the tape until counting of the count GPC is completed for each group of 23 frames. The word PC8 is assigned to a parity for the words PC1 to PC7.

In this embodiment, as described above, the packs "1" and "2" provide four count values GPC, FMC, SSMC, and RMC respectively indicating divisions of data. In other words, these count values represent four types of units. These units are not especially associated with data lengths (recording lengths on a tape), and have predetermined independent lengths. The counts FMC, SSMC, and RMC are represented in association with the count GPC.

FIG. 8 shows the relationship between the counts GPC and SSMC. The number of save set marks from the leading end of the tape until each time when a group of 23 frames is completed is recorded as the count SSMC in each of the 23 frames constituting the group including the timing. In the case of FIG. 8, when the counting of the group GPC 1 is completed, since seven save set marks are counted, SSMC 7 is recorded in each of the 23 frames of the group of GPC 1. The same set of SSMC 8 extends over two groups of GPC 2 and GPC 3. Therefore, counts SSMC 8 are recorded in each of the 46 frames of these groups. The relationships between the other counts FMC and RMC and the count GPC are also determined in the same manner as in FIG. 8. FIG. 9 shows examples of the indications of the counts GPC, FMC, SSMC, and RMC for the respective groups.

Therefore, the above-mentioned counts GPC, FMC, SSMC, and RMC can be selectively detected, so that a high-speed search operation can be performed.

According to the present invention, plural types of data units having independent recording lengths are set, and the numbers of the respective units are recorded. Therefore, when the numbers of these units are detected, a high-speed search operation effectively utilizing the high-speed search function of the DAT can be realized Although the present invention has been shown and described with respect to preferred embodiments, various changes and modifications which are obvious to a person skilled in the art to which the invention pertains are deemed to lie within the spirit and scope of the invention.

What is claimed is:

1. A data recorder for recording on a recording medium digital data supplied from an external source, comprising:

first means for organizing the supplied date into a plurality of frames, with main data and sub data for each frame, and for generating a plurality of different types of data segmentation units, a first type of such data segmentation units being a group of a predetermined number of consecutive frames, a group count signal indicating the number of frame groups counted from a leading end of the recording medium, and a second count signal indicating the number of another type of such data segmentation units counted from the leading end of the recording medium to a trailing end frame of the current frame group; and second means connected to the first means for recording the organized data frame by frame on the recording medium in discrete areas corresponding to each frame, with the main data and sub data of each frame being recorded in a first area and a second area, respectively, in each corresponding discrete area and the group count signal and second count signal are recorded in the second area of each discrete area of each frame forming part of the frame group, including the trailing end frame of the frame group.

2. A data recorder according to claim 1, wherein the first means receives record mark signals from the external source marking the division of a predetermined amount of data sent from the external source and generates a second type of data segmentation unit corresponding to each record mark, and the second count signal is a signal indicating a count value of the record marks sent by the external source along with the data to the data recorder.

3. A data recorder according to claim 1, wherein the first means receives file mark signals from the external source marking the division of a predetermined amount of data sent from the external source and generates a second type of data segmentation unit corresponding to each file mark, and the second count signal is a signal indicating a count value of the file marks sent by the external source along with the data to the data recorder.

4. A data recorder according to claim 1, wherein the first means receives save set mark signals from the external source marking the data recorded during a back-up operation and generates a second type of data segmentation unit corresponding to each save set mark, and the second count signal is a signal indicating a count value of the save set marks sent by the external source along with the data to the data recorder to allow fast searching to a point on the tape without having to know the number of frame groups that have been previously recorded from the leading end of the recording medium up to a particular point on the recording medium.

5. A data recorder according to claim 1, wherein the second count signal is a signal indicating a count value of the number of frames recorded on the recording medium since the beginning of the tape.

6. A data recorder according to claim 1, wherein a DAT is used, the first area is a PCM area and the second area is a sub code area.

7. A method for recording on a recording medium digital data supplied from an external source, comprising the steps of:

organizing the supplied data into a plurality of frames, with main data and sub data for each frame;

generating a plurality of different types of data segmentation units, a first type of such data segmentation units being a group of a predetermined number of consecutive frame, a first count signal indicating the frame groups counted from a leading end of the recording medium, and a second count signal indicating the number of another type of such data segmentation units counted from the leading end of the recording medium to a trailing end frame of the current frame group; and recording the organized data frame by frame on the recording medium in discrete areas corresponding to each frame, with the main data and sub data of each frame being recorded in a first area and a second area, respectively, in each corresponding discrete area and the group count signal and the second count signal values are being recorded in the second area of each discrete area of each frame forming part of the frame group, including the trailing end frame of the frame group.

8. A data recording method according to claim 7, wherein the external source supplies file mark signals marking the division of a predetermined amount of data sent from the external source, one of the types of data segmentation units corresponds to each file mark, and the second count signal is a signal indicating a count value of the file marks sent by the external source along with the data.

9. A data recording method according to claim 7, wherein the external source supplies save set mark signals marking the data recorded during a back-up operation, one of the types of data segmentation units corresponds to each save set mark, and the second count signal is a signal indicating a count value of the save set marks sent by the external source along with the data to allow fast searching to a point on the tape without having to know the number of frame groups that have been previously recorded from the leading end of the recording medium up to a particular point on the recording medium.

10. A data recording method according to claim 7, wherein the external source supplies record mark signals marking the divisions of predetermined amounts of data and one of the types of data segmentation units corresponds to each record mark, and the second count signal is a signal indicating a count value of the record marks sent by the external source along with the data to allow fast searching to a point on the tape without having to know the number of frame groups that have been previously recorded from the leading end of the recording medium up to a particular point on the recording medium.

* * * * *